US008632830B2

(12) United States Patent
Obach et al.

(10) Patent No.: US 8,632,830 B2
(45) Date of Patent: Jan. 21, 2014

(54) FISH FODDER FOR FRESHWATER FISH AND USE OF SUCH FODDER

(75) Inventors: Alex Obach, Stavanger (NO); Laura Gil Martens, Sola (NO); Wolfgang M. Koppe, Stavanger (NO); Vibeke Vikeså, Sandnes (NO)

(73) Assignee: Trouw International B.V., JN Boxmeer (NL)

( * ) Notice: Subject to any disclaimer, the term of this patent is extended or adjusted under 35 U.S.C. 154(b) by 1465 days.

(21) Appl. No.: 10/571,965

(22) PCT Filed: Sep. 2, 2004

(86) PCT No.: PCT/NO2004/000257
§ 371 (c)(1),
(2), (4) Date: Apr. 13, 2006

(87) PCT Pub. No.: WO2005/025324
PCT Pub. Date: Mar. 24, 2005

(65) Prior Publication Data
US 2006/0233916 A1 Oct. 19, 2006

(30) Foreign Application Priority Data
Sep. 15, 2003 (NO) .................................. 20034107

(51) Int. Cl.
A23K 1/16 (2006.01)
A23K 1/18 (2006.01)
(52) U.S. Cl.
USPC .......................................... 426/74; 426/805
(58) Field of Classification Search
USPC ................................................. 426/74, 805
See application file for complete search history.

(56) References Cited

U.S. PATENT DOCUMENTS

| | | |
|---|---|---|
| 2,222,222 A | 11/1940 | Dennis, Jr. |
| 3,615,653 A | 10/1971 | Fults |
| 3,627,885 A | 12/1971 | Rondelet |
| 3,733,204 A * | 5/1973 | Campbell ........................ 426/2 |
| 3,889,007 A | 6/1975 | Gunter et al. |
| 3,892,866 A | 7/1975 | Kanemitsu |
| 3,903,275 A | 9/1975 | Streiff |
| 3,903,304 A | 9/1975 | Groninger, Jr. et al. |
| 3,906,112 A | 9/1975 | Anderson |
| 3,916,832 A | 11/1975 | Sweeney |
| 4,053,646 A | 10/1977 | Wright |
| 4,060,645 A | 11/1977 | Risler |
| 4,061,755 A | 12/1977 | McDougald |
| 4,110,467 A | 8/1978 | Sano |
| 4,141,994 A | 2/1979 | Aneja |
| 4,154,864 A | 5/1979 | Risler |
| RE30,038 E | 6/1979 | Sweeney |
| 4,160,041 A | 7/1979 | Schroeder |
| 4,169,162 A | 9/1979 | Appleman |
| 4,171,681 A | 10/1979 | Berger |
| 4,260,637 A | 4/1981 | Rispoli |
| 4,262,633 A | 4/1981 | Taboga |
| 4,279,932 A | 7/1981 | Koshida |
| 4,284,652 A | 8/1981 | Christensen |
| 4,287,220 A | 9/1981 | Pappas |
| 4,297,973 A | 11/1981 | Knowles |
| 4,312,296 A | 1/1982 | Stelleman |
| 4,351,269 A | 9/1982 | Rines |
| 4,364,928 A | 12/1982 | Martel |
| 4,372,252 A | 2/1983 | Lowry, Jr. |
| 4,376,129 A | 3/1983 | Piukovich |
| 4,379,437 A | 4/1983 | Knowles |
| 4,379,844 A | 4/1983 | Young |
| 4,385,589 A | 5/1983 | Knowles |
| 4,393,087 A | 7/1983 | Sullins |
| 4,396,634 A | 8/1983 | Shenouda |
| 4,405,377 A | 9/1983 | Neuzil |
| 4,409,107 A | 10/1983 | Busch |
| 4,422,408 A | 12/1983 | Pohlhausen |
| 4,436,759 A | 3/1984 | Trilling |
| 4,447,254 A | 5/1984 | Hughes |
| 4,447,530 A | 5/1984 | Young |
| 4,454,161 A | 6/1984 | Okada |

(Continued)

FOREIGN PATENT DOCUMENTS

| | | |
|---|---|---|
| AU | 596359 | 11/1987 |
| CN | 1123617 | 6/1996 |

(Continued)

OTHER PUBLICATIONS

"Nutrient Requirements of Fish", National Research Council, pp. 64-66, 1993.*
"Nutrient Requirements of Fish", National Research Council, 1993, pp. 64-66.*
"Nutrient Requirements of Fish", National Research Council, 1993, pp. 16-32.*
Furuichi et al. Journal of the Faculty of Agriculture—Kyushu University, v. 42(1-2) p. 77-85, 1997.*
Baeverfjord et al., "Development and detection . . . ", Aquacult. Nutr., s. 1-11, 1998.
El-Mowafi & Maage, "Magnesium requirement of . . . ", Aquacult. Nutr. 4, s 31-38, 1998.

(Continued)

Primary Examiner — Chhaya Sayala
(74) Attorney, Agent, or Firm — Vidas, Arrett & Steinkraus, P.A.

(57) ABSTRACT

A rearing fodder of extruded fodder type, comprising proteins, fats and carbohydrates, for freshwater fish, wherein the fish is larger than 2 grams, and wherein the freshwater has a content of $CO_2$ being above 5 milligrams/liter, wherein the fodder has an increased content of at least one of the minerals: phosphate (P), potassium (K), calcium (Ca), sodium (Na) and magnesium (Mg) beyond what exists naturally in the used protein raw materials, fat raw materials and carbohydrate raw materials, wherein the collective amount of minerals in the extruded fodder is at least 10%, on a dry substance basis, of the total weight of the fodder, and wherein one or more of the minerals phosphate (P), potassium (K), calcium (Ca), sodium (Na) and magnesium (Mg) is/are added beyond what exist in the used protein raw materials, fat raw materials and carbohydrate raw materials.

10 Claims, No Drawings

(56) References Cited

U.S. PATENT DOCUMENTS

| | | | |
|---|---|---|---|
| 4,454,804 A | 6/1984 | McCulloch | |
| 4,489,673 A | 12/1984 | Pohlhausen | |
| RE31,804 E | 1/1985 | Skoch | |
| 4,500,558 A | 2/1985 | Fulger | |
| 4,501,593 A | 2/1985 | Paersch | |
| 4,508,029 A | 4/1985 | Malone | |
| 4,508,741 A | 4/1985 | Corbett | |
| 4,534,317 A | 8/1985 | Walsh | |
| 4,557,942 A | 12/1985 | Goodman | |
| 4,584,024 A | 4/1986 | Hisada | |
| 4,597,969 A | 7/1986 | Maxfield | |
| 4,631,284 A | 12/1986 | Salpekar | |
| 4,741,904 A * | 5/1988 | Smith et al. | 426/1 |
| 4,769,248 A | 9/1988 | Wilkins | |
| 4,798,168 A | 1/1989 | Vadseth | |
| 4,808,417 A | 2/1989 | Masuda | |
| 4,811,460 A | 3/1989 | Emanuelsen | |
| 4,820,527 A | 4/1989 | Christensen | |
| 4,822,626 A | 4/1989 | Spanier | |
| 4,830,866 A | 5/1989 | Manser | |
| 4,833,793 A | 5/1989 | White | |
| 4,834,957 A | 5/1989 | VandeWalle | |
| 4,844,927 A | 7/1989 | Morris, II | |
| 4,852,521 A | 8/1989 | Harrington | |
| 4,861,822 A | 8/1989 | Keskey | |
| 4,863,754 A | 9/1989 | Ibuki | |
| 4,868,203 A | 9/1989 | Ueno | |
| 4,871,551 A | 10/1989 | Spencer | |
| 4,873,111 A | 10/1989 | Aaltonen | |
| 4,881,482 A | 11/1989 | Sandwith | |
| 4,902,674 A | 2/1990 | Speights | |
| 4,903,414 A | 2/1990 | White | |
| 4,904,477 A | 2/1990 | Ho | |
| 4,908,218 A | 3/1990 | Laurent | |
| 4,917,904 A | 4/1990 | Wakameda | |
| 4,922,856 A | 5/1990 | Sweeney, Jr. | |
| 4,935,250 A | 6/1990 | Cox | |
| 4,950,488 A | 8/1990 | Schweitzer | |
| 4,952,415 A | 8/1990 | Winowiski | |
| 4,960,795 A | 10/1990 | Salte | |
| 4,967,697 A | 11/1990 | Lau | |
| 4,971,809 A | 11/1990 | DeLaporte | |
| 4,971,820 A | 11/1990 | Likuski | |
| 4,972,802 A | 11/1990 | Huddleston | |
| 4,973,490 A | 11/1990 | Holmes | |
| 4,976,971 A | 12/1990 | Laurent | |
| 4,976,977 A | 12/1990 | Johnson | |
| 4,978,225 A | 12/1990 | Reimer | |
| 4,981,711 A | 1/1991 | Kearns | |
| 4,986,993 A | 1/1991 | Chanen | |
| 4,987,124 A | 1/1991 | Speights | |
| 4,994,458 A | 2/1991 | Kilbride, Jr. | |
| 4,999,193 A | 3/1991 | Nguyen | |
| 5,009,908 A | 4/1991 | Molaug | |
| 5,013,906 A | 5/1991 | Miyakawa | |
| 5,030,657 A | 7/1991 | Burtle et al. | |
| 5,047,463 A | 9/1991 | Keskey | |
| 5,088,822 A | 2/1992 | Kanda | |
| 5,102,671 A | 4/1992 | Coles | |
| 5,125,167 A | 6/1992 | Stearns | |
| 5,125,168 A | 6/1992 | Aigeldinger | |
| 5,182,208 A | 1/1993 | Johnson | |
| 5,183,609 A | 2/1993 | Miyahara | |
| 5,207,012 A | 5/1993 | Lael | |
| 5,210,186 A | 5/1993 | Mikalsen | |
| 5,215,766 A | 6/1993 | Schaub | |
| 5,215,767 A | 6/1993 | Mitsuhashi | |
| 5,216,029 A | 6/1993 | Anderson | |
| 5,229,146 A | 7/1993 | Tanaka | |
| 5,229,726 A | 7/1993 | Kent | |
| 5,234,701 A | 8/1993 | Cummings | |
| 5,236,723 A | 8/1993 | Lajoie | |
| 5,239,180 A | 8/1993 | Clarke | |
| 5,242,292 A | 9/1993 | Wenger | |
| 5,244,681 A | 9/1993 | Vinci | |
| 5,262,184 A | 11/1993 | Rorvik | |
| 5,268,357 A | 12/1993 | Yabiki | |
| 5,271,162 A | 12/1993 | Kunz | |
| 5,281,434 A | 1/1994 | Winowiski | |
| 5,281,596 A | 1/1994 | Kitao | |
| 5,292,523 A | 3/1994 | Kono | |
| 5,299,530 A | 4/1994 | Mukadam | |
| 5,336,792 A | 8/1994 | Sola | |
| 5,337,698 A | 8/1994 | Widmyer | |
| 5,352,153 A | 10/1994 | Burch | |
| 5,356,809 A | 10/1994 | Johnson | |
| 5,362,753 A | 11/1994 | Blum | |
| 5,371,085 A | 12/1994 | Nakano | |
| 5,378,471 A * | 1/1995 | Smith | 424/442 |
| 5,391,371 A | 2/1995 | Jacobsen | |
| 5,399,193 A | 3/1995 | Bergh | |
| 5,410,035 A | 4/1995 | Wakabayashi | |
| 5,431,944 A | 7/1995 | Melvej | |
| 5,433,865 A | 7/1995 | Laurent | |
| 5,446,991 A | 9/1995 | Brackus | |
| 5,453,565 A | 9/1995 | Mawson | |
| 5,478,583 A | 12/1995 | Jarrett | |
| 5,499,490 A | 3/1996 | Minnich | |
| 5,518,742 A | 5/1996 | Soeda | |
| 5,525,350 A | 6/1996 | Hansen | |
| 5,525,353 A | 6/1996 | Fajt | |
| 5,527,553 A | 6/1996 | Kazemzadeh | |
| 5,545,411 A | 8/1996 | Chancellor | |
| 5,556,624 A | 9/1996 | Araki | |
| 5,556,625 A | 9/1996 | Araki | |
| 5,565,211 A | 10/1996 | Rossi | |
| 5,573,792 A | 11/1996 | Dessen | |
| 5,587,193 A | 12/1996 | Kazemzadeh | |
| 5,587,268 A | 12/1996 | Defieuw | |
| 5,591,343 A | 1/1997 | Kitaoka | |
| 5,593,978 A | 1/1997 | Jacobs | |
| 5,598,770 A | 2/1997 | Campbell | |
| 5,605,699 A | 2/1997 | Bernhard | |
| 5,616,343 A | 4/1997 | Cartilier | |
| 5,622,744 A | 4/1997 | Matson | |
| 5,622,859 A | 4/1997 | Iritani | |
| 5,624,671 A | 4/1997 | Araki | |
| 5,628,279 A | 5/1997 | Bones, IV | |
| 5,628,998 A | 5/1997 | Araki | |
| 5,629,038 A | 5/1997 | Kalmbach | |
| 5,637,312 A | 6/1997 | Tock | |
| 5,637,333 A | 6/1997 | Lawrence | |
| 5,651,330 A | 7/1997 | Jewett | |
| 5,652,009 A | 7/1997 | Mair | |
| 5,658,605 A | 8/1997 | Soeda | |
| 5,670,548 A | 9/1997 | Bernhard | |
| 5,690,715 A | 11/1997 | Schiwek | |
| 5,693,296 A | 12/1997 | Holtzapple | |
| 5,700,474 A | 12/1997 | Preiser | |
| 5,700,510 A | 12/1997 | Hauck | |
| 5,714,184 A | 2/1998 | Major | |
| 5,722,346 A | 3/1998 | Tremblay | |
| 5,739,006 A | 4/1998 | Abe | |
| 5,744,186 A | 4/1998 | Harrison | |
| 5,750,466 A | 5/1998 | Wedegaertner | |
| 5,753,286 A | 5/1998 | Higgins | |
| 5,758,602 A | 6/1998 | Fuglsang | |
| 5,760,406 A | 6/1998 | Powers | |
| 5,770,253 A | 6/1998 | Ladstein | |
| 5,773,043 A | 6/1998 | Hunter | |
| 5,773,051 A | 6/1998 | Kim | |
| 5,783,240 A | 7/1998 | Wenger | |
| 5,789,001 A | 8/1998 | Klopfenstein | |
| 5,795,585 A | 8/1998 | Ikeda | |
| 5,801,050 A | 9/1998 | Uchida | |
| 5,804,245 A | 9/1998 | Desoomer | |
| 5,839,391 A | 11/1998 | Shaar | |
| 5,840,528 A | 11/1998 | VanOoyen | |
| 5,840,860 A | 11/1998 | Annison | |
| 5,846,585 A | 12/1998 | Ohmura | |
| 5,849,345 A | 12/1998 | Giger | |
| 5,863,586 A | 1/1999 | Johnsen | |
| 5,865,898 A | 2/1999 | Holtzapple | |
| 5,869,121 A | 2/1999 | Brescia | |

(56) References Cited

U.S. PATENT DOCUMENTS

| | | |
|---|---|---|
| 5,871,550 A | 2/1999 | Goedegebuur |
| 5,874,118 A | 2/1999 | Roslashedrvik |
| 5,876,990 A | 3/1999 | Reddy |
| 5,882,701 A | 3/1999 | Motozono |
| 5,893,337 A | 4/1999 | Sevic |
| 5,897,886 A | 4/1999 | Harrison |
| 5,902,581 A | 5/1999 | Clarkson |
| 5,904,942 A | 5/1999 | Iritani |
| 5,928,686 A | 7/1999 | Ivey |
| 5,937,790 A | 8/1999 | Ito |
| 5,943,810 A | 8/1999 | Bennett |
| 5,948,454 A | 9/1999 | Virkki |
| 5,952,033 A | 9/1999 | Anantharaman |
| 5,964,917 A | 10/1999 | Latting |
| 5,970,917 A | 10/1999 | Keith, Jr. |
| 5,972,414 A | 10/1999 | Harris |
| 5,979,363 A | 11/1999 | Shaar |
| 5,991,588 A | 11/1999 | Kraft |
| 6,014,222 A | 1/2000 | Borggaard |
| 6,022,137 A | 2/2000 | White |
| 6,024,875 A | 2/2000 | Sevic |
| 6,042,872 A | 3/2000 | Kemme-Kroonsberg |
| 6,051,219 A | 4/2000 | Kubota |
| 6,051,269 A | 4/2000 | Harris |
| 6,056,981 A | 5/2000 | Saxby |
| 6,068,863 A | 5/2000 | Dupart |
| 6,083,520 A | 7/2000 | Toneby |
| 6,090,416 A | 7/2000 | Iritani |
| 6,112,699 A | 9/2000 | Saxby |
| 6,113,974 A | 9/2000 | Winowiski |
| 6,117,313 A | 9/2000 | Goldman |
| 6,118,542 A | 9/2000 | Andersen |
| 6,120,802 A | 9/2000 | Breitenbach |
| 6,120,811 A | 9/2000 | Ghani |
| 6,123,614 A | 9/2000 | Kozycki |
| 6,126,961 A | 10/2000 | Kross |
| 6,132,625 A | 10/2000 | Moffett |
| 6,132,716 A | 10/2000 | Morgan |
| 6,132,796 A | 10/2000 | Johnsen |
| 6,136,353 A | 10/2000 | Munz |
| 6,140,365 A | 10/2000 | Kiy |
| 6,153,251 A | 11/2000 | Fukuhara |
| 6,162,473 A | 12/2000 | Fodge |
| 6,166,086 A | 12/2000 | Taub |
| 6,168,803 B1 | 1/2001 | Harris |
| 6,168,815 B1 | 1/2001 | Kossmann |
| 6,174,558 B1 | 1/2001 | Lamptey |
| 6,192,833 B1 | 2/2001 | Brune |
| 6,197,361 B1 | 3/2001 | Anantharaman |
| 6,203,835 B1 | 3/2001 | Westermarck |
| 6,207,202 B1 | 3/2001 | Crews |
| 6,214,337 B1 | 4/2001 | Hayen |
| 6,221,424 B1 | 4/2001 | Kalmbach |
| 6,229,031 B1 | 5/2001 | Strohmaier |
| 6,238,709 B1 | 5/2001 | Kalmbach |
| 6,238,720 B1 | 5/2001 | Popper |
| 6,238,726 B1 | 5/2001 | Fischer |
| 6,245,364 B1 * | 6/2001 | Jones et al. .................. 426/2 |
| 6,251,626 B1 | 6/2001 | Stougaard |
| 6,258,387 B1 | 7/2001 | McEwen |
| 6,258,846 B1 | 7/2001 | Hermelin |
| 6,264,681 B1 | 7/2001 | Usui |
| 6,265,005 B1 | 7/2001 | Haverkos |
| 6,265,882 B1 | 7/2001 | Madsen |
| 6,280,995 B1 | 8/2001 | Andersen |
| 6,284,034 B1 | 9/2001 | Hiorns |
| 6,284,502 B1 | 9/2001 | Maenz |
| 6,287,550 B1 | 9/2001 | Trinh |
| 6,291,006 B1 | 9/2001 | Butterbaugh |
| 6,294,536 B1 | 9/2001 | Miki |
| 6,299,867 B1 | 10/2001 | Aoyagi |
| 6,299,912 B1 | 10/2001 | Ito |
| 6,299,913 B1 | 10/2001 | Block |
| 6,299,928 B1 | 10/2001 | Takeuchi |
| 6,299,936 B1 | 10/2001 | Reck |
| 6,303,175 B1 | 10/2001 | Kurzinger |
| 6,303,572 B1 | 10/2001 | Rowe |
| 6,306,911 B1 | 10/2001 | Wachter |
| 6,310,078 B1 | 10/2001 | Connolly |
| 6,317,385 B1 | 11/2001 | Hedgepeth |
| 6,318,023 B1 | 11/2001 | Yamashita |
| 6,322,807 B1 | 11/2001 | vanOoyen |
| 6,322,818 B1 | 11/2001 | Rebier |
| 6,322,826 B2 | 11/2001 | Zohoungbogbo |
| 6,322,827 B1 | 11/2001 | Scott |
| 6,326,024 B1 | 12/2001 | Vasilatos-Younken |
| 6,326,398 B1 | 12/2001 | Chiang |
| 6,333,062 B1 | 12/2001 | Fontana |
| 6,335,041 B1 | 1/2002 | Baur |
| 6,335,102 B1 | 1/2002 | Tsubaki |
| 6,337,096 B1 | 1/2002 | Koppe |
| 6,342,599 B1 | 1/2002 | Dyker |
| 6,352,732 B2 | 3/2002 | Lanner |
| 6,359,040 B1 | 3/2002 | Burdick |
| 6,362,159 B1 | 3/2002 | Aguadisch |
| 6,365,140 B1 | 4/2002 | Melby |
| 6,365,218 B1 | 4/2002 | Borschel |
| 6,368,579 B1 | 4/2002 | Barr |
| 6,371,051 B1 | 4/2002 | Klein |
| 6,372,460 B1 | 4/2002 | Gladue |
| 6,372,774 B1 | 4/2002 | Hatton |
| 6,379,737 B1 | 4/2002 | Butterbaugh |
| 6,387,394 B1 | 5/2002 | Baichwal |
| 6,387,419 B1 | 5/2002 | Christensen |
| 6,391,352 B1 | 5/2002 | Hawkes |
| 6,395,315 B1 | 5/2002 | Matsuura |
| 6,399,104 B1 | 6/2002 | Creekmore |
| 6,399,117 B1 | 6/2002 | Hoff |
| 6,402,826 B1 | 6/2002 | Yuan |
| 6,410,041 B1 | 6/2002 | Lewis |
| 6,413,912 B2 | 7/2002 | Hall |
| 6,414,158 B1 | 7/2002 | Dyker |
| 6,419,977 B1 | 7/2002 | Born |
| 6,429,000 B1 | 8/2002 | Andersen |
| 6,429,185 B1 | 8/2002 | OlleroNovo |
| 6,440,437 B1 | 8/2002 | Krzysik |
| 6,440,470 B2 | 8/2002 | McEwen |
| 6,440,477 B2 | 8/2002 | Nishioka |
| 6,443,098 B1 | 9/2002 | Blyth |
| 6,443,256 B1 | 9/2002 | Baig |
| 6,468,688 B2 | 10/2002 | Kazacos |
| 6,468,964 B1 | 10/2002 | Rowe |
| 6,475,539 B1 | 11/2002 | DeWille |
| 6,486,128 B1 | 11/2002 | Huq |
| 6,510,815 B1 | 1/2003 | Lagardere |
| 6,528,100 B1 | 3/2003 | Hoff |
| 6,530,966 B1 | 3/2003 | Kriech |
| 6,555,128 B2 | 4/2003 | Miyashita |
| 6,571,736 B2 | 6/2003 | Patterson |
| 7,317,142 B2 | 1/2008 | Bootland |
| 2002/0025911 A1 | 2/2002 | Aoyagi |
| 2002/0094357 A1 | 7/2002 | Aloise |
| 2002/0106398 A1 | 8/2002 | Miyashita |
| 2002/0112671 A1 | 8/2002 | Patterson |
| 2002/0182290 A1 | 12/2002 | Nielsen |
| 2002/0192335 A1 | 12/2002 | DAbramo |
| 2003/0017231 A1 | 1/2003 | Hjaltason |
| 2003/0035861 A1 | 2/2003 | Hoff |
| 2003/0055011 A1 | 3/2003 | Huq |
| 2003/0059416 A1 | 3/2003 | Slinde |
| 2003/0072866 A1 | 4/2003 | Higgs |
| 2003/0097993 A1 | 5/2003 | Hjaltason |
| 2003/0104113 A1 | 6/2003 | Strissel |
| 2003/0119910 A1 | 6/2003 | Kamiya |
| 2003/0131800 A1 | 7/2003 | Yoshimura |
| 2003/0170371 A1 | 9/2003 | Jobe |

FOREIGN PATENT DOCUMENTS

| | | |
|---|---|---|
| DE | 3306027 | 8/1984 |
| EP | 0221642 | 8/1986 |
| EP | 0220253 | 6/1990 |
| EP | 0402877 | 6/1990 |
| EP | 0888860 | 1/1999 |

(56) References Cited

FOREIGN PATENT DOCUMENTS

| | | |
|---|---|---|
| EP | 0664961 | 8/1999 |
| EP | 1250850 | 10/2002 |
| EP | 1284101 | 2/2003 |
| EP | 1527700 | 5/2005 |
| GB | 2210245 | 6/1989 |
| GB | 2232573 | 12/1990 |
| GB | 2241862 | 9/1991 |
| GB | 1604381 | 12/1991 |
| GB | 2324701 | 11/1998 |
| JP | 51013696 | 2/1976 |
| JP | 55124461 | 3/1979 |
| JP | 58028234 | 2/1983 |
| JP | 58149645 | 9/1983 |
| JP | 59078650 | 5/1984 |
| JP | 2138944 | 5/1990 |
| JP | 5198932 | 8/1993 |
| JP | 6209716 | 8/1994 |
| JP | 6261692 | 9/1994 |
| JP | 8332052 | 12/1996 |
| JP | 9028312 | 2/1997 |
| JP | 2002218940 | 8/2002 |
| KR | 20030071236 | 9/2003 |
| NO | 161474 | 5/1989 |
| NO | 19910390 | 2/1991 |
| NO | 991081 | 3/1999 |
| NO | 19991447 | 3/1999 |
| NO | 20034107 | 9/2003 |
| NO | 321757 | 4/2004 |
| RO | 90915 | 1/1987 |
| RU | 2127044 | 3/1999 |
| WO | 8606253 | 11/1986 |
| WO | 8606256 | 11/1986 |
| WO | 8704051 | 7/1987 |
| WO | 9207154 | 4/1992 |
| WO | 9306742 | 4/1993 |
| WO | 9314645 | 8/1993 |
| WO | 9403073 | 2/1994 |
| WO | 9421141 | 9/1994 |
| WO | 9503711 | 2/1995 |
| WO | 9507028 | 3/1995 |
| WO | 9528830 | 11/1995 |
| WO | 9621363 | 7/1996 |
| WO | 97/22265 | 6/1997 |
| WO | 9803080 | 1/1998 |
| WO | 9816121 | 4/1998 |
| WO | 9849904 | 11/1998 |
| WO | 9951107 | 10/1999 |
| WO | 0057718 | 10/2000 |
| WO | 0195747 | 12/2001 |
| WO | 0224000 | 3/2002 |
| WO | PCT/NO2004/000257 | 9/2004 |
| WO | 2006/130015 | 12/2006 |
| WO | 2008148873 | 12/2008 |

OTHER PUBLICATIONS

Fivelstad, Sveinung et al.: "Long-term subiethal effects of carbon dioxide on Atlantic Salmon smolts (*Salmo salar* L.): ion regulation, hematology, element composition, nephrocalcinosis and growth parameters," & Aquaculture (2003), 215 (1-4), 301-319, STN International, file CAPLUS, CAPLUS accession No. 2002:854375, Document No. 138:299003.

Fivelstad, S. et al.; "The effects of carbon dioxide on Salmon smolt"; in "Norsk Fiskeoppdrett", pp. 40-41, No. 16, 1998.

Maage, Amund, "Trace element in . . . ", Institute of Nutrition, Dir. Of Fish., Bergen, 1994.

M. Lorentzen et al.; "Trace element status of juvenile Atlantic Salmon *Salmo salar* L. Fed a fish-meal based diet with or without supplementation of zinc, iron, manganese and copper from first feeding", Aquaculture Nutrition, vol. 5, pp. 163-171, 1999, abstract.

Romanenko, V. D. et al.; "Inorganic ionic composition of blood and tissues in fish with carbon dioxide academia" & Fiziologichnii Zhurnal (klev. 1955-1977) (1977), 23(5), 631-5, STN International, file CAPLUS, CAPLUS accession No. 1977-597766, Document No. 87:197766.

Lindsay et al., "The Growth of Rainbow Trout (*Salmo gairdneri*) Given Diets Containing Chitin and its Relationship to Chitinolytic Enzymes and Chitin Digestibility", Aquaculture, 37 (1984) 315-334.

"Feedbond" downloaded from www.en.engormix.com, dated Jan. 2008, 2 pages.

"Vital Wheat Gluten" downloaded from www.gillco.com/pr_vital-wheat-gluten.php.daed Sep. 2008, 3 pages.

Abstract of: "Enzymic crosslinking as a tool for food colloid theology control and interfacial stabilization", Trends in Food Science & Technology, (1997) 8 (10) 334-339, 57 ref., ISSN: 0924-2244.

Abstract of: "Modification of food proteins by covalent crosslinking," Dep. of Food Tech., Massey Univ., Palmerston North, New Zealand, Trends in food Science & Technology, (1991) 2, (8) 196-200, 44 ref.

Abstract of: "The role of covalent cross-linking in the texturizing of muscle protein sols," Dep. of food sci., North Carolina State Univ., Raleigh, NC 27695-7624, USA, Journal of Muscle Foods (1995) 6 (2) 125-138, 51 ref.

Abstract of: "The usefulness of transglutaminase for food processing", ACS Symp. Ser. (1996), 637 (Biotechnology for Improved Foods and Flavors), 29-38.

B. Bjerkeng et al., "Astaxanthin deposition in fillets of Atlantic salmon *Salmo salar* L. fed two dietary levels of astaxanthin in combination with three levels of a-tocopheryl acetate," Aquaculture Research, 1999, 30, 637-646.

B. Bjerkeng et al., "Quality parameters of the flesh of Atlantic salmon(*Salmo salar*) as affected by dietary fat content and full-fat soybean meal as a partial substitute for fish meal in the diet," Aquaculture 157 (1997) 297-309.

Belitz and Grosch, Food Chemistry, Second Edition, 1999, p. 767-775.

Buttle et al., "The effect of feed pigment type on flesh pigment deposition and colour in farmed Atlantic salmon, *Salmo salar* L.," Aquaculture Research, 2001, 32, 103-111.

Edwin N. Frankel, Antioxidants in Food and Biology Facts and Fiction, p. 157-159.

Einen et al. "Ernaeringsbiologi hos oppdrettsfisk" i: Havbruksforskning fra merd til mat, Havbruk-produskjion av akvatiske organismer, Norges forskingsrad 2006, ISBN 82-12-02278-1, s. 190-205.

Espe et al. 1999 "Nutrient absorption and growth of Atlantic salmon (*Salmo salar* L.) fed fish protein concentrate" Aquaculture vol. 174 pp. 119-137.

Fox, J.E., "Seed gums," In: Imeson, A. (ed.) Thickening and Gelling Agents for Food, Blackie Academic & Professional, London p. 262-282.

Japanese Patent Abstract for Application No. 2-138945.
Japanese Patent Abstract for Application No. 3-180162.
Japanese Patent Abstract for Application No. 3-180163.
Japanese Patent Abstract for Application No. 3-180164.
Japanese Patent Abstract JP58028234-830219.
Japanese Patent Abstract JP58149645-830906.
Japanese Patent Abstract JP6209716-940802.
Japanese Patent Abstract JP6261692-940920.
Japanese Translation JP6261692.
JP Abstract for Application No. 2-138943.
JP Abstract for Application No. 2-138944.
JP Abstract for Application No. 09/182561.

Mommsen T.P. "Paradigms ogf growth in fish." Compo Biochem. and Phsiol., Part B 1289, 2001, S. 207-219.

Mustafa, MG et al. "A Review: Dietary Benfefits of Algae As An Additive in Fish Feed," Isr. J. Aquacult/Bamidquh, vol. 47, No. 3-4, 1995, p. 155-162 (summary).

Norges forskiningsrad, Havbruk -en naering i veskst, Faktaark. "Amino acid nutrition and metabolism: findings during a post-doctoral research stay in the United States." puliisert Mar. 15, 2007.

O.J. Torrissen, "Strategies for salmonid pigmentation," J. Appl. Ichthyol. 11 (1995), 276-281.

O.J. Torrissen et al., "Astaxanthin deposition in the flesh of Atlantic Salmon, *Salmo salar* L., in relation to dietary astaxanthin concentration and feeding period," Aquaculture Nutrition 1995 1; 77-84.

Ole J. Torrissen, " Pigmentation of Salmonids: Interactions of Astaxanthin and Canthaxanthin on Pigment Deposition in Rainbow Trout," Aquaculture, 79 (1989) 363-374.

(56) References Cited

OTHER PUBLICATIONS

Ole J. Torrissen et al., "Pigmentation of Salmonids-Variation in Flesh Carotenoids of Atlantic Salmon," Aquaculture, 68 (1988) 305-310.
Onsoyen, E., "Alginates," In: A. (ed.) Thickening and Gelling Agents for Food, Blackie Academic & Professional, London p. 22-44.
R. Christiansen et al., "Effects of Polyunsaturated Fatty Acids and Vitamin E On Flesh Pigmentatin In Atlantic Salmon (*Salmo salar*)," Fish Nutrition in Practice, Biarritz (France), Jun. 24-27, 1991, p. 339-343.
R. Christiansen et al., "Growth and survival of Atlantic salmon, *Salmo salar* L., fed different dietary levels of astaxanthin. First-feeding fry," Aquaculture Nutrition 1995 1; 189-198.
Riley et al. Influence of dietary arginie and Aquaculture nutrition, 1996, 2 s 235-242.
Spyridakis, et al., "Studies on Nutrient Digestibility in European Sea Bass (*Dicentrarchus labrax*) 2. Effect of Sodium Alginate on Protein and Lipid Digestibility," Aquaculture, 77 (1989) pp. 71-73.
Storebakken, T. et al., "Binders in Fish Feeds II. Effect of Different Alignates on the Digestibility of Macronutrients in Rainbow Trout," Aquaculture. vol. 60, No. 2, 1987, p. 121-131.
Storebakken, T. et al. "Binders in Fish Feeds I. Effect of Alginate and Guar Gum on Growth, Digestibility, Feed Intake and Passage Through the Gastrointestinal Tract of Rainbow Trout," Aquaculture, 1985, vol. 47, p. 11-26.
U. Nordgarden et al., "Seasonal changes in selected muscle quality parameters in Atlantic salmon (*Salmo salar* L.) reared under natural and continuous light," Aquaculute Nutrition 2003 9; 161-168.
Wataru Miki, "Biological functions and activities of animal carotenoids," Pure & Appl. Chem., vol. 63, No. 1, pp. 141-146, 1991.
Wilson & Halver, "Protein and amino acid requirements of fishes," Ann.Rev.Nutr., 1986,6,225-244, side 234.

XIII ISFNF—International Symposium on Fish Nutrition and Feeding, Fish and Crustacean Nutrition: Present Knowledge and Future Perspectives, Jun. 1-5, 2008.
Maoka et al., Machine translation of JP 2006-050901, published on Feb. 23, 2006; accessed on Oct. 11, 2012; available at: http://www19.ipdl.inpit.go.jp/PA1/result/detail/main/wl6eaiaDA418050901P1.htm.
Seiwa, Machine translation of JP 2002-218940, published Aug. 6, 2002; accessed on Oct. 11, 2012; available at: http://www19.pdl.inpit.go.jp/PA1/result/detail/main/wl6eaiaDA414218940P1.htm.
Messina et al., The Dietitian's Guide to Vegetarian Diets, Issues and Applications, Jones and Bartlett Publishers, Inc., 2004, p. 233.
Noubigh et al., Solubility of Gallic Acid, Vanillin, Syringic Acid, and Protocatechuic Acid in Aqueous Sulfate Solutions from (293.15 to 318.15) K, J. Chem. Eng. Data 2008. p. 1675-1678.
Krinsky et al., Carotenoids in Health and Disease, Marcel Dekker, Inc., 2004, p. 44.
Karamac et al., Comparison of Radical-scavenging Activities for Selected Phenolic Acids, Pol. J. Food Nutr. Sci., 2005, p. 165-170.
Rokey, G.J. 1994. "Petfood and fishfood extrusion", In: Ed: Frame, N.D. "The Technology of Extrusion Cooking", Blackie Academic & Professionals.
H. George Ketola—Requirement of Rainbow Trout for Dietary Phosphorus and Its Relationship to the Amount Discharged in Hatchery Effluents—Transaction of the American Fisheries Society 1994—123:587-594.
PCT/NO2004/000257—PCT International Preliminary Report on Patentability mailed Mar. 16, 2006.
PCT/NO2004/000257—International Search Report mailed Dec. 17, 2004.
PCT/NO2004/000257—Written Opinion of the International Search Report Authority mailed Dec. 17, 2004.

* cited by examiner

FISH FODDER FOR FRESHWATER FISH AND USE OF SUCH FODDER

CROSS REFERENCE TO RELATED APPLICATIONS

This application is a National Stage of PCT Publication No. 2004/000257 filed Sep. 2, 2004 which claims priority to Norwegian Patent Application No. 20034107 filed Sep. 15, 2003.

BACKGROUND OF THE INVENTION

The invention concerns a fodder for freshwater fish, more particularly a fodder having an increased content of minerals relative to that previously described as necessary for providing fish with a good growth.

Some salmon fish are anadromous fish. Sexually mature fish migrate from seawater to freshwater to spawn, while the offspring migrate back to the sea to grow. The eggs are hatched at the river bottom, and the juvenile salmon (fry) spend their initial lifetime in the river water. In the spring, great physiological changes occur in the fry as it prepares for the transition from living in freshwater to living in seawater. The preceding autumn, when subjected to natural conditions, the fry determines whether it is large enough to migrate as smolt the next spring. In nature, the time between hatching and migrating may vary from more than one year to 5 years, depending on water temperature and food availability.

Rearing of salmon and sea trout must follow the natural mode of living for the fish. Having fertilized the eggs, the eggs are hatched in freshwater. The fish go through the yolk sack stage and the fry stage in tanks in a hatchery. In a hatchery, it is possible to manipulate both water temperature and lighting conditions, so as to control the timing of smoltification in a different manner than in nature. As such, smolt is referred to as 0-yearlings, 1-yearlings and 2-yearlings. O-yearlings are planted as smolt the first autumn after hatching in the winter, while the 1-yearlings spend more than one year in the hatchery.

After smoltification, reared fish are put into fish cages in seawater to grow until slaughtering. A daily weight increase depends on body weight and may be compared to the effect of capital size in an interest calculation. Two smolt of equal quality concerning health and physiological adaptation and planted in the sea simultaneously, may grow equally fast in terms of percentages (specific growth rate), but the larger one will reach a slaughtering size prior to the other one.

In intensive rearing of fish, the duration from hatching to smoltification, and the size of the smolt at smoltification, is of great economic importance. The size of tied-up capital, in the form of fish, is of great importance to the profitability of both the fingerling producer and the producer of consumable fish.

Rearing of salmon has become more intense. The industry has grown fast, and the need for smolt has been on the increase. Many fingerling producers are restricted in terms of withdrawing more freshwater from their water sources. This has caused the fish density in the rearing tanks of the hatcheries to increase. Among other things, this has been made possible by adding oxygen ($O_2$) to the water. Consequently, the amount of carbon dioxide ($CO_2$) in the water also has increased dramatically, up to as much as 40 milligrams $CO_2$/liter (mg $CO_2$/l) and above. The concentration of $CO_2$ in the water depends on the water quality. Water having a low conductivity, typical of for example the coastal region of Norway, has a low buffer quality, and therefore the content of $CO_2$ in this water becomes larger than that of more ion-rich water. Thus, watercourses in Southern and Western Norway receiving acid rain possess a water quality having conductivities down towards 10 mikroSiemens/centimeter ($\mu$S/cm). Most common in Norwegian watercourses is a water quality between 25-75 $\mu$S/cm. In comparison, regions of Eastern Norway having calcareous bedrock possess a water quality having conductivities of ca. 300 $\mu$S/cm. In order for the water to possess a certain buffer capacity, the conductivity should be above 30 $\mu$S/cm.

Fish being exposed to a high $CO_2$-level (5 mg/l and above) over an extended time, will attain an increased level of $CO_2$ in their blood (hypercapnia), and the amount increases with the amount in the water. This results in an increased content of bicarbonate in order to compensate for the $CO_2$-increase, the result being that the pH-value of the blood decreases (respiratory acidosis). Fish having acidosis will seek to counteract this condition by mobilising ions from the bone structure and secrete phosphate via the kidney. A high content of $CO_2$ in the water provide a negative influence on growth and health of the fish. Fish exposed to high $CO_2$-levels may develop nefrocalcinosis, which is distinguished by calcium precipitating and depositing in the kidney. This is observed already at 5-10 mg/l and has been described from 15 mg/l and up (Fivelstad, S. et al.; "The effects of carbon dioxide on salmon smolt"; in "Norsk Fiskeoppdrett", pages 40-41, no. 16, 1998).

In intensive rearing of fish, extruded fish fodder is used most commonly. This is composed of proteins, carbohydrates and fats. The protein raw materials may consist of animal protein sources, such as fish meal, bone meal, blood meal and feather meal, and of vegetable protein sources, such as soy, corn gluten, wheat gluten and lupines. Carbohydrates are primarily added as a binding agent to provide the fodder pellet with a sustainable shape and mechanical strength. The carbohydrate source may be whole or ground up wheat, potato starch or other starch sources. In order to increase the energy content of the fish fodder, animal oil, such as fish oil or vegetable oil, including rapeseed oil or soybean oil, is generally added after forming in the extruder step and the subsequent drying step. These raw materials also contain minerals. Thus, phosphate and other minerals, for example, are included in fishbone remnants of fish meal. Phosphate also is occurs as phosphate lipids in the protein sources and in the oil sources.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All US patents and applications and all other published documents mentioned anywhere in this application are incorporated herein by reference in their entirety.

Without limiting the scope of the invention a brief summary of the claimed embodiments of the invention is set forth below. Additional details of the summarized embodiments of the invention and/or additional embodiments of the invention may be found in the Detailed Description of the Invention below.

SUMMARY OF THE INVENTION

The present invention relates to improving the growth of fish reared in freshwater particularly with respect to improving the growth of fingerlings of salmon (*Salmo salar*) and rainbow trout (*Oncorhynchus mykiss*), and of other anadromous fish species of salmon.

In its broadest aspect, the present invention relates to improving the growth of fish reared in freshwater by increasing the mineral content of formulated fish fodder beyond what the literature describes as necessary for ensuring a good growth.

The present invention relates to a rearing fodder of an extruded fodder type that includes proteins, fats and carbohydrates. The fodder according to this embodiment has an increased content of at least one of the minerals of phosphate (P), potassium (K), calcium (Ca), sodium (Na) and magnesium (Mg) beyond what exists naturally in the protein raw materials, fat raw materials and carbohydrate raw materials used in the rearing fodder. The collective amount of minerals in the extruded fodder is suitably at least 10% on a dry substance basis of the total weight of the fodder, and wherein one or more of the minerals phosphate (P), potassium (K), calcium (Ca), sodium (Na) and magnesium (Mg) is/are added beyond what exist in the used protein raw materials, fat raw materials and carbohydrate raw materials.

The present invention is suitable for freshwater fish of larger than 2 grams.

The present invention finds utility for fish that reside in freshwater having a content of $CO_2$ above 5 milligrams/liter.

These and other aspects, embodiments and advantages of the present invention will become immediately apparent to those of ordinary skill in the art upon review of the Detailed Description and Claims to follow.

DETAILED DESCRIPTION OF THE INVENTION

All published documents including all US patent documents, mentioned anywhere in this application are hereby expressly incorporated by reference herein in their entirety. Any copending patent applications, mentioned anywhere in this application are also hereby expressly incorporated by reference herein in their entirety.

Common to fodder for rearing of freshwater fish types is that they initially have added thereto what is considered to be necessary amounts of minerals for maintaining a good growth. For the specific minerals, the following target numbers for the fodder recipes are to be used for freshwater fish:

phosphate (P)—1.09%, potassium (K)—0.72%,
calcium (Ca)—1.34%, magnesium (Mg)—0.17%,
sodium (Na)—0.64%.

Deviations from this may occur, both in terms of dosing inaccuracy during production, and also in terms of analysis inaccuracy.

The present invention relates to the addition of minerals beyond the levels which have been generally considered to be adequate. The additional or extra mineral amounts added to the fish fodder shall be hereinafter referred to as a premix. The person skilled in the art will know that the term premix also is used for addition of trace minerals considered necessary for growth. Such mineral mixes will contain for example the trace elements copper (Cu), zinc (Zn), manganese (Mn), iodine (I), and also relatively small amounts of calcium (Ca), magnesium (Mg) and potassium (K). This description is based on the fact that premix refers to the extra addition, and that minerals already have been added in a common manner without making reference thereto.

An inert filling material denoted Diamol®, diatomaceous earth, available from Biakon, N.V. in Grobbendonk, Belgium, is used. This has been done for the recipes to be equivalent concerning protein level and fat level. Among other things, Diamol® contains Ca (1.2%), P (0.7%), Mg (0.5%), K (0.72%), Na (0.47%) and Fe (2.4%). Contrary to mineral premixes containing digestible mineral compounds, Diamol® contains indigestible mineral compounds. Up to 4% of Diamol® is added. Thus, the specified minerals will contribute little to the total amount thereof. For total ash content, however, Diamol® will contribute considerably, inasmuch as almost the entire addition will remain in the ash analysis.

In the following, non-limiting examples of preferred embodiments are described, in which the effect is shown through test results referred to.

EXAMPLE 1

The study was carried out on salmon (*Salmo salar*). The average start weight was 0.15 grams (g), and the fish was observed for 231 days until smoltification. The water temperature was constant at 13.1±1.7 degrees Centigrade (° C.). The fish was stocked at ca. 300 fish per tank in a total of 12 tanks. Each tank contained 60 l of water.

For the test, two diets were made. One fodder was a standard fodder containing 9.3% of minerals (ash; normal mineral group=NM-group). Initially, the other fodder was of the same composition, but an additional 4% of pre-ashed fish meal was added to constitute a total mineral content of 12.3% (high mineral group=HM-group).

When the fish was from 0.15 g to ca. 2.5 g, an agglomerated fodder was used. This was subjected to sieving, forming nutritionally equivalent compositions of the used fractions: 0.3-0.5 millimeters (mm); 0.5-0.8 mm; and 0.8-1.2 mm.

TABLE 1.1

Analysis of fodder composition.
(The values are provided on a dry substance basis.)

| Analysis (%) | Standard fodder | | | Standard fodder + 4% of pre-ashed fish meal | | |
|---|---|---|---|---|---|---|
| | Agglom-erated | Extruded (mm) 2 | Extruded (mm) 3 | Agglom-erated | Extruded (mm) 2 | Extruded (mm) 3 |
| Protein | 56.5 | 48.5 | 48.8 | 54.6 | 49.2 | 49.0 |
| Fat | 21.5 | 21.8 | 23.2 | 22.1 | 22.8 | 22.7 |
| Water | 6.9 | 7.0 | 6.3 | 6.2 | 5.7 | 7.2 |
| Total minerals (ash) | 8.1 | 9.2 | 8.9 | 9.7 | 12.7 | 12.0 |
| P | 1.24 | 1.44 | 1.48 | 1.08 | 2.08 | 1.87 |
| K | 0.75 | 0.79 | 0.80 | 0.71 | 1.05 | 0.95 |
| Ca | 1.57 | 2.06 | 2.08 | 1.32 | 3.02 | 2.67 |
| Mg | 0.18 | 0.13 | 0.13 | 0.16 | 0.19 | 0.17 |
| Na | 0.65 | 0.58 | 0.60 | 0.99 | 0.90 | 0.80 |

Moreover, the fish groups were divided in two with respect to $CO_2$-amount in the water. In 6 tanks, no extra $CO_2$ was added, the $CO_2$-level therefore corresponding to the $CO_2$-secretion from the fish. In the other 6 tanks, an increasing $CO_2$-amount was added as the fish were growing. Until the fish reached 10 g, no extra $CO_2$ was added. For the sizes 10-15 g; 15-20 g; and from 20 g to smolt; $CO_2$ was added to reach a concentration in the water of 10; 20; and 35 mg $CO_2$/l, respectively. Thus, the study comprised 4 groups, each group randomly distributed between 3 tanks.

River water along the coast of Norway is acidic and possesses a low buffer capacity. In Norwegian rearing of fingerling, it is therefore common practice to add small amounts of UV-radiated seawater to buffer the ion-deficient freshwater. In this study, 0.5‰ seawater (5 l seawater per m³) therefore was added to the freshwater as long as the desired $CO_2$-amount was up to 10 mg/l in some of the tanks. The admixing of seawater was increased to 1.5‰ when the $CO_2$-amount increased to 20 mg/l, and to 2.5‰ when the $CO_2$-amount was increased to 35 mg/l. Inasmuch as the pipeline network for supply of water was the same for all tanks, the admixing of seawater was identical for all tanks, irrespective of the amount of supplied $CO_2$.

TABLE 1.2

Measured $CO_2$-level (lowest and highest; mg/l) and pH-value in the water.

| Desired amount of $CO_2$ (mg/l) in the water | Fish weight (g) | | | | | | | |
|---|---|---|---|---|---|---|---|---|
| | <10 | | 10-15 | | 15-20 | | >20 | |
| | $CO_2$ (mg/l) | pH | $CO_2$ (mg/l) | pH | $CO_2$ (mg/l) | pH | $CO_2$ (mg/l) | pH |
| No addition | – | – | 2.7-5.1 | 6.50-6.82 | 4.7-6.0 | 6.63-6.77 | 6.6-7.8 | 6.58-6.72 |
| 10 | | | 8.7-11.3 | 6.17-6.27 | | | | |
| 20 | | | | | 17.1-20.0 | 6.11-6.17 | | |
| 35 | | | | | | | 33.5-37.3 | 5.72-5.88 |

—: not measured

TABLE 1.3

Weighing results in grams (g).

| | Time of testing (days after start) | | | | | |
|---|---|---|---|---|---|---|
| | 97 | | 190 | | 231 | |
| Group | Average | Sd. | Average | Sd. | Average | Sd. |
| NM, no $CO_2$ | 8.1 | 1.4 | 52.4 | 3.6 | 80.2 | 6.3 |
| HM, no $CO_2$ | 9.2 | 0.8 | 55.9 | 2.3 | 82.3 | 7.3 |
| NM, increased $CO_2$ | 8.1[a] | 0.6 | 42.8 | 1.9 | 54.8 | 2.4 |
| HM, increased $CO_2$ | 10.5[a] | 0.3 | 51.8 | 0.7 | 65.1 | 2.2 |

NM: normal level of minerals in the fodder
HM: high level of minerals in the fodder
Sd: standard deviation
[a] no addition of $CO_2$ The study shows that an increased content of minerals beyond what is recommended provides a surprising, positive effect on the growth. For fish growing from 0.15 g to 10 g, the fish receiving extra minerals have a better growth. In this phase, no extra $CO_2$ was added to the water. When no extra $CO_2$ was added to the water, the fish pervasively exhibited a better growth during the entire study, but this difference is not statistically significant. Also, the study clearly showed that an increased amount of $CO_2$ in the water restrained the growth. An increased amount of minerals could not completely compensate for this, but the group receiving an increased amount of minerals had an average weight being 20% better than that of the group receiving a standard fodder of good nutritional quality. An increased content of $CO_2$ fall within ordinary production requirements. The NM-group without and with addition of $CO_2$ had a specific growth of 2.72 and 2.56%/day, respectively, while the HM-group without and with addition of $CO_2$ had a specific growth of 2.74 and 2.64%/day, respectively. This growth is estimated from 6 g to smoltification. The growth was good for all groups.

EXAMPLE 2

The study was carried out on salmon (*Salmo salar*). The average start weight was 49.1 g, and the fish was observed for 41 days until smoltification. The water temperature was constant at 14.0±1.4° C. The fish was stocked at 90 fish per tank in a total of 20 tanks. The tanks were circular tanks with a diameter of 1.0 meter.

The diameter of the fodder particles was 3 mm. For the test, 10 diets were made. One fodder was a control fodder containing 10.9% of minerals. 4% of Diamol was added as filler in this fodder. Initially, the other fodder had the same composition, but an additional 4% of pre-ashed fish meal was added and a further 0.5% of Diamol. This contained 12.2% of minerals. Initially, the remaining fodders were also the same as the control fodder, but 4% of mineral premixes customised for this study were added. These fodders contained 11.6% of minerals, and no Diamol was added thereto.

A series of mineral premixes were produced in order to study whether the collective amount of minerals is of significance, or whether single components provide the advantageous effect observed in Example 1. A complete premix was tested together with premixes in which one of the elements: P, Ca, K and Mg was removed. Additionally, one premix was tested in which both P and Ca were removed; one premix in which P, Ca and Mg were removed; and one premix in which P, Ca, Na and Cl were removed.

TABLE 2.1

Composition of the test fodders.
(The values are provided on a dry substance basis.)

| Analysis | Standard fodder | Fodder + 4% ash | Complete premix | Premix – P |
|---|---|---|---|---|
| Protein (%) | 51.6 | 49.8 | 48.8 | 50.6 |
| Fat (%) | 22.5 | 23.7 | 24.5 | 23.9 |
| Water (%) | 4.5 | 5.0 | 5.5 | 4.5 |
| Total minerals (ash) (%) | 10.9[a] | 12.2[b] | 11.6 | 11.6 |
| P (%) | 1.4 | 1.9 | 1.8 | 1.4 |
| K (%) | 0.95 | 1.1 | 1.1 | 1.1 |
| Ca (%) | 1.7 | 2.5 | 2.4 | 2.3 |
| Mg (%) | 0.17 | 0.21 | 0.19 | 0.20 |

[a] 4% of Diamol added
[b] 0.5% of Diamol added

TABLE 2.2

Weighing results in grams (g) at start and after 41 days.

| Fodder type | Start weight (g) | Final weight (g) | Growth in % | Relative growth in relation to control |
|---|---|---|---|---|
| Control | 48.3 | 83.7 | 73.3 | 100 |
| Control + pre-ashed fish meal | 50.6 | 89.7 | 77.2 | 105.3 |
| Control + complete premix | 48.6 | 88.1 | 81.4 | 111.0 |
| Control + premix − P | 47.9 | 85.5 | 78.3 | 106.7 |
| Control + premix − Ca | 47.7 | 85.9 | 80.2 | 109.4 |
| Control + premix − K | 49.3 | 87.9 | 78.4 | 106.9 |
| Control + premix − Mg | 49.6 | 91.4 | 84.5 | 115.3 |
| Control + premix − (P + Ca) | 51.0 | 91.4 | 79.0 | 107.8 |
| Control + premix − (P + Ca + Mg) | 49.3 | 89.0 | 80.6 | 109.9 |
| Control + premix − (P + Ca + Na + Cl) | 48.6 | 87.8 | 80.9 | 110.3 |

In relation to the fish receiving control fodder, the fish receiving pre-ached fish meal had a 5.3% higher body weight, and the groups receiving different variants of premix all had a better growth than that of the groups receiving control fodder or fodder with pre-ashed fish meal. The growth was from 6.7% to as much as 15.3% better, which is very surprising during a time as short as 41 days. Accordingly, the study showed that the customised premixes replaced the pre-ashed fish meal, and that the growth became even better. Surprisingly, the study also showed that it is the collective amount of extra minerals that is of significance. Individual minerals may be taken out of the premix without the growth becoming worse than that of the control fodder.

EXAMPLE 3

The study was carried out on salmon (*Salmo salar*). The average start weight was 2.5 g, and the fish was observed for 182 days until smoltification. The water temperature was constant at 14.0±0.9° C. The fish was stocked at ca. 300 fish per tank in a total of 24 tanks. Each tank contained 60 liters of water. For the test, 2 diets were made. One fodder was a control fodder containing 9.0% of ordinary minerals (NM-group), but wherein an additional 4% of Diamol was added. Initially, the other fodder had the same composition, but an additional 4% of the same mineral premix as that described in Example 2 (HM-group) was added. The mineral content was 12.0%.

At start-up of the study, two tanks, in which the fish received a control fodder having an addition of 4% of Diamol, and two tanks, in which the fish received fodder of increased mineral content, were restrained with respect to addition of extra $CO_2$ to the water. In these tanks, no extra $CO_2$ was added during the study. In the other tanks, extra $CO_2$ was added at start-up in order for the total amount of $CO_2$ to be ca. 5 mg/l. After 14 days, the amount of $CO_2$ supplied to the water was increased in order for it to be ca. 10 mg/l. At this point in time, 4 more tanks (2 tanks for each diet) were restrained in order for these to continue at ca. 10 mg/l of $CO_2$ in the water for the remainder of the study. This procedure was repeated after further 14 days, thereby increasing the amount of $CO_2$ in the water to 15 mg/l, and then increasing the amount of $CO_2$ in the water to 20 mg/l after another 14 days. Each time, 4 and 4 tanks were restrained to continue throughout the study with 15 and 20 mg/l of $CO_2$ in the water, respectively. At this point in time, the fish was weighed in at ca. 8 g. After another 14 days, $CO_2$ in the water was increased to 35 mg/l in the last 4 tanks, and the described $CO_2$-regime was maintained for the remainder of the study.

As in Example 1, UV-radiated seawater was supplied to the freshwater for buffering thereof 0.5‰ seawater was supplied to the freshwater throughout the entire study.

TABLE 3.1

Measured $CO_2$-level (lowest and highest; mg/l) and pH-value in the water.

| Desired amount of $CO_2$ (mg/l) in the water | After 30 days $CO_2$ (mg/l) | pH | After 49 days $CO_2$ (mg/l) | pH |
|---|---|---|---|---|
| No addition | — | — | — | — |
| 5 | 4.0-8.1 | 6.34-6.49 | 6.2-6.6 | 6.38-6.42 |
| 10 | 9.5-9.9 | 6.24-6.25 | 8.1-9.5 | 6.20-6.28 |
| 15 | 12.1-13.2 | 6.10-6.12 | 21.7-22.8 | 5.98-6.03 |
| 20 | — | — | 20.2-25.7 | 5.88-5.92 |

—: not measured

TABLE 3.2

Analysis of fodder composition.
(The values are provided on a dry substance basis.)

| Analysis | Control fodder, extruded (mm) | | | Extruded fodder + 4% of mineral mix (mm) | | |
|---|---|---|---|---|---|---|
| | 1.5 | 2 | 3 | 1.5 | 2 | 3 |
| Protein | 49.4 | 50.9 | 50.9 | 49.4 | 50.5 | 50.6 |
| Fat | 23.5 | 23.4 | 22.0 | 24.7 | 23.4 | 22.6 |
| Water | 4.7 | 4.8 | 5.2 | 4.3 | 5.6 | 5.7 |
| Total of minerals (ash) | 11.1[a] | 11.1[a] | 11.0[a] | 13.8 | 10.6 | 10.6 |
| P (%) | 1.4 | 1.3 | 1.3 | 1.8 | 1.8 | 1.7 |
| K (%) | 0.78 | 1.1 | 1.1 | 0.98 | 1.3 | 1.3 |
| Ca (%) | 2.2 | 1.2 | 1.2 | 2.8 | 1.9 | 1.8 |
| Mg (%) | 0.16 | 0.16 | 0.17 | 0.19 | 0.19 | 0.19 |
| Na (%) | 0.68 | 0.56 | 0.56 | 0.98 | 0.81 | 0.80 |

[a] 4% of Diamol added

TABLE 3.3

Weighing results in grams (g).

| Desired level for total amount of $CO_2$ (mg/l) in the water | Time of testing (days after start) | | | | | | | | | | | |
|---|---|---|---|---|---|---|---|---|---|---|---|---|
| | 56 | | | | 99 | | | | 182 | | | |
| | NM | | HM | | NM | | HM | | NM | | HM | |
| | Avg. | Sd. | Avg. | Sd. | Avg. | Sd. | Avg. | Sd. | Avg. | Sd. | Avg. | Sd. |
| 0 | 6.6 | 0.2 | 8.6 | 0.8 | 18.1 | 4.6 | 23.9 | 1.6 | 50.7 | 3.6 | 64.8 | 9.5 |
| 5 | 7.7 | 0.6 | 9.0 | 0.3 | 26.3 | 4.3 | 24.7 | 0.1 | 57.7 | 8.0 | 65.2 | 2.4 |
| 10 | 7.9 | 0.3 | 9.0 | 1.2 | 25.4 | 5.6 | 28.1 | 3.7 | 61.0 | 1.9 | 67.0 | 4.4 |
| 15 | 7.2 | 0.6 | 8.9 | 0.1 | 20.8 | 3.1 | 29.3 | 3.2 | 57.0 | 2.2 | 71.9 | 0.4 |
| 20 | 7.7 | 0.1 | 8.9 | 0.0 | 23.9 | 4.6 | 28.2 | 4.2 | 57.9 | 2.9 | 71.3 | 4.3 |
| 35 | 7.3 | 0.2 | 8.8 | 0.0 | 19.5 | 0.0 | 23.0 | 1.8 | 51.8 | 0.6 | 62.0 | 6.2 |
| Avg. | 7.4 | 0.5 | 8.9 | 0.5 | 22.3 | 4.4 | 26.2 | 3.3 | 56.0 | 4.8 | 67.0 | 5.4 |

NM: normal level of minerals in the fodder
HM: high level of minerals in the fodder
Avg: average
Sd: standard deviation Already after 56 days, a significant weight difference existed between the groups receiving control fodder (NM) and the groups receiving fodder with an increased mineral content (1-IM). Collectively for all groups, fish receiving a fodder with increased content of minerals weighed 19.5% more than fish receiving control fodder. After 99 and 182 days, the corresponding difference was 17.5 and 19.7%. In this study, there was no marked effect of the amount of $CO_2$ in the water. This may be due to the fish not growing very well in this study. Specific growth rate for the entire period was between 1.73 og 1.82%/day for the NM-groups, and 1.84-1.93%/day for the HM-groups.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

The invention claimed is:

1. An extruded rearing fish fodder for fresh water fish, comprising proteins, fats and carbohydrates and the extruded fish fodder further comprising at least 1.09% of phosphorous (P), at least 0.72% of potassium (K), at least 1.34% of calcium (Ca), at least 0.64% of sodium (Na) and at least 0.17% of magnesium (Mg), on a dry substance basis, of the total weight of the fodder; wherein the summed total amount of phosphorous, potassium, calcium, sodium and magnesium in the extruded fodder is at least 5.79% and less than 7.31% on a dry substance basis, of the total weight of the fodder.

2. The rearing fish fodder according to claim 1, wherein the amount of phosphorous (P) is within the range 1.1-2.1%, on a dry substance basis, of the total weight of the fodder.

3. The rearing fish fodder according to claim 1, wherein the amount of potassium (K) is within the range 0.7-1.1%, on a dry substance basis, of the total weight of the fodder.

4. The rearing fish fodder according to claim 1, wherein the amount of calcium (Ca) is within the range 1.3-3.0%, on a dry substance basis, of the total weight of the fodder.

5. The rearing fish fodder according to claim 1, wherein the amount of sodium (Na) is within the range 0.6-0.9%, on a dry substance basis, of the total weight of the fodder.

6. The rearing fish fodder according to claim 1, wherein the amount of magnesium (Mg) is within the range of 0.17-0.21%, on a dry substance basis, of the total weight of the fodder.

7. A method of improving the growth of a freshwater fish, the method comprising the steps of:
providing an extruded rearing fodder, the fodder comprising proteins, fats, carbohydrates, and at least 1.09% of phosphorous (P), at least 0.72% of potassium (K), at least 1.34% of calcium (Ca), at least 0.64% of sodium (Na), and at least 0.17% of magnesium (Mg) on a dry substance basis, of the total weight of the fodder; and the summed amount of phosphorous, potassium, calcium, sodium and magnesium in the extruded fodder is at least 5.79% and less than 7.31% on a dry substance basis of the total weight of the fodder; and
feeding said enhanced fish fodder to fish which reside in freshwater.

8. The method of claim 7 wherein said fish are larger than 2 grams.

9. The rearing fish fodder according to claim 1, wherein the summed amount of phosphorous, potassium, calcium and magnesium in the extruded fodder is at least 4.99% and less than 6.34% on a dry substance basis, of the total weight of the fodder.

10. The rearing fish fodder according to claim 1, wherein the summed amount of phosphorous, potassium, and magnesium in the extruded fodder is at least 3.21% and less than 4.31% on a dry substance basis, of the total weight of the fodder.

* * * * *